United States Patent
Kim

(10) Patent No.: US 6,827,667 B2
(45) Date of Patent: Dec. 7, 2004

(54) SELECT-SHOCK CONTROL SYSTEM AND METHOD FOR AUTOMOTIVE AUTOMATIC TRANSMISSION

(75) Inventor: Joung-Chul Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 31 days.

(21) Appl. No.: 10/299,872

(22) Filed: Nov. 18, 2002

(65) Prior Publication Data

US 2003/0100402 A1 May 29, 2003

(30) Foreign Application Priority Data

Nov. 28, 2001 (KR) ........................................ 2001-74445

(51) Int. Cl.$^7$ .............................................. B60K 41/04
(52) U.S. Cl. ........................ 477/112; 477/68; 477/117; 477/141
(58) Field of Search ........................... 477/68, 111, 116, 477/117, 138, 139, 140, 141, 156, 112

(56) References Cited

U.S. PATENT DOCUMENTS 4,263,826 A * 4/1981 Hartz et al. .................... 477/30
4,631,679 A * 12/1986 Klatt ............................. 701/52
4,694,709 A * 9/1987 Kikuchi et al. ................ 477/94
4,821,607 A * 4/1989 Kawai .......................... 477/123
4,843,909 A * 7/1989 Hasegawa et al. ...... 477/117 X

FOREIGN PATENT DOCUMENTS

| JP | 56-57524 | * | 5/1981 | |
| JP | 05-180302 | * | 7/1993 | .................. 477/46 |
| JP | 7027215 | | 1/1995 | |
| JP | 10-220575 | * | 8/1998 | |

* cited by examiner

Primary Examiner—Ha Ho
(74) Attorney, Agent, or Firm—Morgan Lewis & Bockius LLP

(57) ABSTRACT

The method for decreasing gear select shock comprises determining whether a vehicle is stopped and if idle conditions exist based on vehicle operating parameters. It is then determined whether the vehicle has been stopped for longer than a predetermined period. If it is determined the vehicle has been stopped for longer than the predetermined period, the automatic transmission is up-shifted into a higher speed gear from a first speed gear. The automatic transmission may then be shifted into neutral from a drive range through line pressure control, upon detecting selection of a neutral gear.

9 Claims, 2 Drawing Sheets

SELECT-SHOCK CONTROL SYSTEM AND METHOD FOR AUTOMOTIVE AUTOMATIC TRANSMISSION

FIELD OF THE INVENTION

The present invention relates to an automatic transmission control system and a method thereof that is capable of decreasing gear select shock generated when a shift lever is shifted.

BACKGROUND OF THE INVENTION

Generally, in an automatic transmission of a vehicle, if a driver selects a desired range by moving a shift lever, a port of a manual valve changes so that a predetermined line pressure is generated by hydraulic oil supplied from an oil pump. This causes an transmission control unit to control of a plurality of solenoid valves, based on vehicle operating conditions such as vehicle speed and throttle position, in order to shift the automatic transmission into a desired gear.

For example, if the shift lever is positioned in drive (D) when the vehicle is stopped, line pressure is formed in shift control valves and a pressure control valve. A rear clutch is then engaged by generating line pressure through a N to D control valve to achieve a first speed.

If the shift lever is shifted into neutral (N) from drive (D) once the first speed has been achieved, line pressure in the shift control valves, the pressure control valve, and the rear clutch, is released regardless of any control. Output torque, which maintains the first speed, instantaneously disappears so that a gear select shock occurs. Such gear select shock is generally referred to as a D to N gear select shock.

The release of the hydraulic pressure which occurs just after shifting into neutral (N) from drive (D), is mainly determined by the structural characteristics of the automatic transmission, such as a mounting assembly of a valve body, a valve orifice, an accumulator spring, etc. Therefore, any control of the release of the hydraulic pressure is difficult.

To decrease the D to N gear select shock, methods have been developed to change the valve orifice and the spring coefficient of the accumulator spring. However, effects of such changes are relatively small, and they inevitably necessitate changes in the valve body, which has a complicated structure.

SUMMARY OF THE INVENTION

In a preferred embodiment of the present invention, the shift control system for decreasing gear select shock comprises a vehicle speed sensor, a throttle position sensor, an inhibitor switch, an idle switch, a controller, and an actuator. The vehicle speed sensor detects a vehicle speed. The throttle position sensor detects a throttle position. The inhibitor switch detects a position of a shift lever. The idle switch detects whether an engine is in an idle state. The actuator is controlled by the controller and shifts the automatic transmission into a specific gear. The controller controls the automatic transmission in order to decrease gear select shock generated when the shift lever is shifted into neutral from a drive range, and up-shifts the automatic transmission if a vehicle is stopped and idle conditions exist in the drive range.

In a further preferred embodiment of the present invention, the controller up-shifts the automatic transmission to a second speed gear from a first speed gear if a vehicle is stopped and idle conditions exist in the drive range.

In a further preferred embodiment of the present invention, the controller up-shifts the automatic transmission to a third speed gear from a first speed gear if a vehicle is stopped and idle conditions exist in the drive range.

In an alternative embodiment of the present invention, it is determined whether a vehicle is stopped and whether idle conditions exist based on vehicle operating parameters. It is then determined whether the vehicle has been stopped for longer than a predetermined period in an automatic forward drive range. The automatic transmission is then sifted to a higher speed gear from a first speed gear if it is determined that the vehicle has been stopped for longer than the predetermined period in the drive range. The automatic transmission is then shifted into neutral by applying pressure when a selection of a neutral range from the automatic forward drive range is detected. It is preferable that in the up-shifting step, the automatic transmission is shifted from a first speed gear to a second speed gear or a third speed gear.

In a further preferred embodiment of the present invention, the automatic transmission is down-shifted from the up-shifted speed gear to a first speed gear if an off signal of the idle switch is detected.

According to another embodiment of the invention, there is provided a shift control system for decreasing gear select shock in an automatic transmission. The shift control system includes a vehicle sensor, a throttle sensor, an inhibitor switch, an idle switch, a controller, and an actuator. The vehicle speed sensor is configured to detect a vehicle speed. The throttle position sensor is configured to detect a throttle position. The inhibitor switch is configured to detect a position of a shift lever. The idle switch is configured to detect whether an engine is in an idle state. The controller is coupled to the vehicle sensor, throttle sensor, inhibitor switch, idle switch, and actuator. The controller includes a memory including instructions for determining whether said vehicle is stopped, in a drive gear, and has been in an idle state for a predetermined period of time. The memory also includes instructions for shifting the automatic transmission into a higher drive gear than said drive gear, such that torque is reduced, thereby decreasing gear shift shock on a subsequent shift into neutral. The actuator is controlled by the controller for shifting the automatic transmission into a specific gear.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, preferred embodiments of the present invention will be described in detail with reference to the accompanying drawings.

Figure 1:
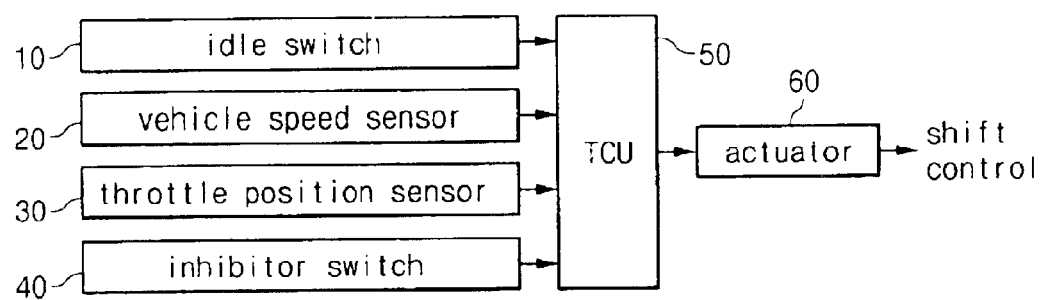
FIG. 1 is a block diagram of the gear select shock control system, according to the present invention.

As shown in FIG. 1, the control system for decreasing the D-N select-shock according to the invention comprises an idle switch 10, a vehicle speed sensor 20, a throttle position sensor 30, an inhibitor switch 40, a transmission control unit (hereinafter referred to as a TCU) 50, and an actuator 60.

The TCU 50 is preferably a microprocessor that executes a predetermined program, such as a set of instructions for performing the shift control method described below. The microprocessor and associated hardware and other software as may be necessary for operation may be selected by persons of ordinary skill in the art.

The idle switch 10 determines whether an engine is in an idle state, and outputs a corresponding electrical signal to the TCU 50. An "on" signal of the idle switch indicates the idle state, and an "off" signal of the idle switch indicates the non-idle state. The vehicle speed sensor 20 detects a current vehicle speed based on a driven gear speed, and outputs a corresponding signal to the TCU 50. The throttle position sensor 30 detects a position of a throttle valve that operates together with an accelerator pedal, and outputs a corresponding signal to the TCU 50. The inhibitor switch 40 detects a position of the shift lever, and outputs a corresponding signal to the TCU 50. The TCU 50 determines a target speed from a predetermined shift pattern map, based on signals from the idle switch, the vehicle speed sensor, the throttle position sensor, and the inhibitor switch.

If the TCU 50 determines that a vehicle is stopped for longer than a predetermined period in an idle state, the TCU generates a signal for shifting the automatic transmission into a second speed, or a third speed, from a first speed in the drive (D) range in order to decrease gear select shock generated during the movement of the shift lever from the drive (D) range to neutral (N).

The actuator 60 operates according to the control signal input from the TCU 50, and shifts the automatic transmission into a specific gear by engaging or disengaging a plurality of friction elements of the automatic transmission, as is well understood in the art.

Figure 2:
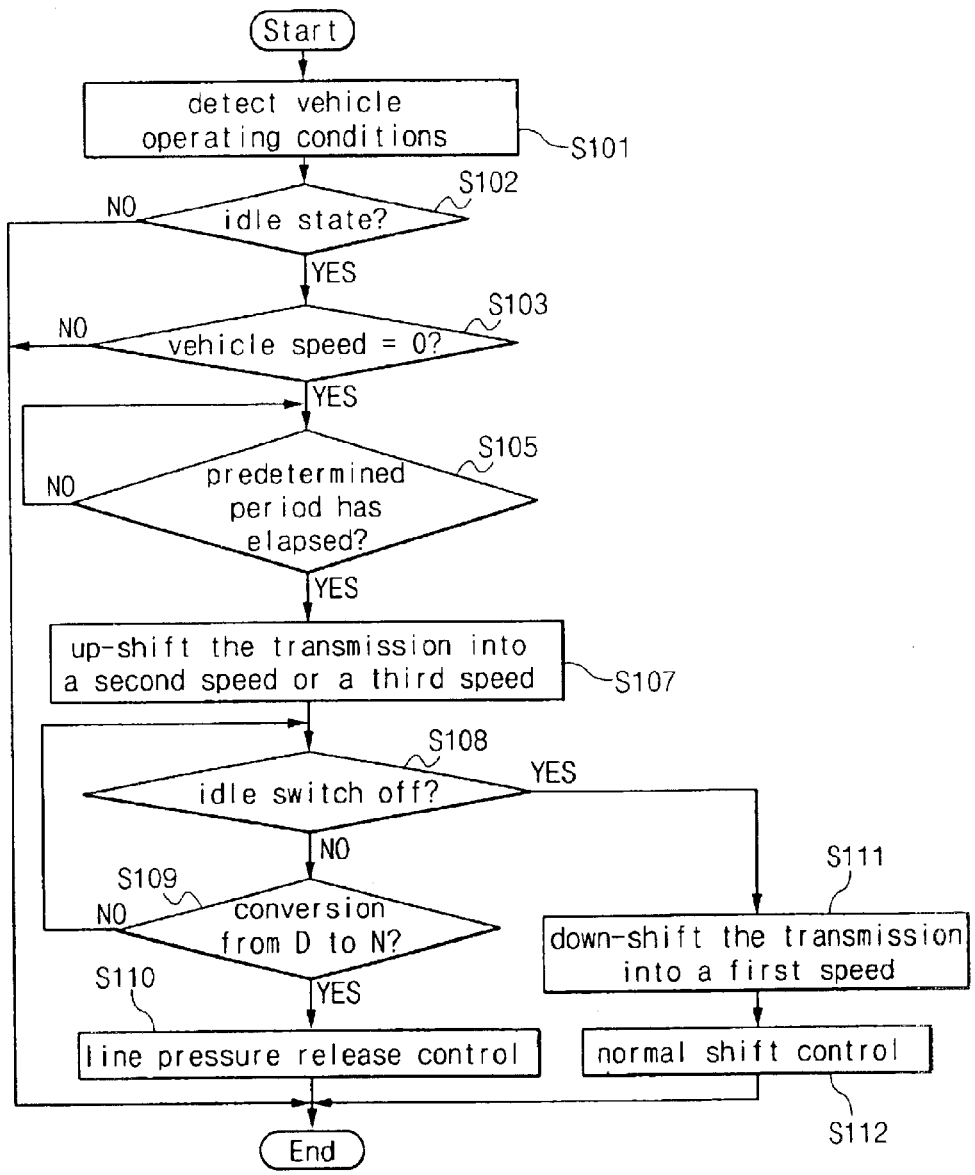
FIG. 2 is a flow chart of the gear select shock control method, according to the present invention.

FIG. 2 is a flow chart of the gear select shock control method, according to the present invention. The TCU 50 determines whether the shift lever is positioned in the drive (D) range, whether the idle switch is on, and whether the throttle valve position satisfies the idle condition based on signals of the inhibitor switch, the idle switch, and the throttle position sensor (step S101 and step S102). If the vehicle is in an idle state (S102—yes), the TCU 50 determines if the vehicle is stopped, that is, if the vehicle speed is equal to 0, at step S103. If it is determined that the vehicle speed is equal to 0 (step S103—yes), the TCU determines if a predetermined period has elapsed, at step S105 from a timer. If the vehicle has stopped for longer than the predetermined period, while idling, it may be indicative of the driver's intention to park the vehicle for a substantial period, or the driver's intention to shift into neutral (N).

If a predetermined period has elapsed (S105—yes), the TCU 50 outputs a signal for up-shifting into a second speed or a third speed from a first speed at step S107. The output torque in the second speed or the third speed is less than that in the first speed. Therefore, the gear select shock generated when shifting into neutral from the second or third speed is less than that generated when shifting into neutral from the first speed. Consequently, the D to N gear select shock is decreased.

Once shifted into the second or third speeds, the TCU 50 determines if the idle switch is "on" at step S108. If the idle switch is not "off", i.e., it is "on" (S108—no), then the TCU 50 determines if the shift lever position has been changed from the drive (D) range to neutral (N) at step S109. If it is determined that the shift lever has been shifted into neutral (N) from the drive (D) range (S109—yes), the TCU 50 outputs a control signal to the actuator 60 for rapidly releasing the line pressure, and thereby the automatic transmission is shifted into neutral at step S110.

If there is no change of the range from the drive (D) range into neutral (N) (S109—no), the procedure repeats itself at step S108 where the TCU determines if the idle switch is "off".

On the other hand, if it is determined that the idle switch is off (S108—yes), the TCU 50 outputs a control signal to the actuator 60 for down-shifting into the first speed from the second speed or the third speed in order to increase an output torque response for rapidly accelerating the vehicle at step S111. The TCU 50 then performs normal shift controls based on the vehicle speed and throttle position at step S112.

Accordingly, when the shift lever is shifted to neutral (N) from the drive (D) range, the line pressure is released controlling the second speed or the third speed to shift the automatic transmission into neutral. Consequently, the D to N gear select shock substantially decreases as compared to shifting into neutral from the first speed.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control system for decreasing gear select shock in an automatic transmission, comprising:
    a vehicle speed sensor for detecting a vehicle speed;
    a throttle position sensor for detecting a throttle position;
    an inhibitor switch for detecting a position of a shift lever;
    an idle switch for detecting whether an engine is in an idle state;
    a controller for controlling the automatic transmission in order to decrease gear select shock generated when the shift lever is shifted into neutral from a drive range, the controller up-shifting the automatic transmission to a higher gear if a vehicle is stopped and idle conditions exist in the drive range;
    an actuator controlled by the controller for shifting the automatic transmission into a specific gear, wherein the actuator downshifts the automatic transmission from the higher gear into first gear if an off signal of the idle switch is detected.

2. The system of claim 1, wherein the controller up-shifts the automatic transmission into a second speed in the drive range from a first speed in the drive range if the vehicle is stopped and the idle conditions exist.

3. The system of claim 1, wherein the controller up-shifts the automatic transmission into a third speed in the drive range from a first speed in the drive range if the vehicle is stopped and the idle conditions exist.

4. A shift control method for decreasing gear select shock in an automatic transmission, comprising:
    determining whether a vehicle is stopped and whether idle conditions exist based on vehicle operating parameters;
    determining whether the vehicle has been stopped for longer than a predetermined period in a drive range;
    up-shifting the automatic transmission into a higher speed gear from a first speed gear if it is determined that the vehicle has been stopped for longer than the predetermined period in the drive range;
    shifting the automatic transmission into neutral from a drive range through line pressure control upon detecting selection of a neutral gear; and downshifting the automatic transmission from the higher speed gear into the first speed gear if an off signal of an idle switch is detected.

5. The method of claim 4, wherein in the up-shifting, the automatic transmission is shifted from the first speed gear into a second speed gear or a third speed gear.

6. A method for decreasing gear select shock in an automatic transmission of a vehicle, comprising:

determining whether said vehicle is stopped, in a drive gear, and has been in an idle state for a predetermined period of time;

shifting the automatic transmission into a higher drive gear than said drive gear, such that torque is reduced, thereby decreasing gear shift shock on a subsequent shift into neutral; and downshifting from the higher drive gear into the drive near if an off signal from an idle switch is detected.

7. The method of claim 6, further comprising shifting the automatic transmission into neutral by applying a line pressure upon detecting selection of neutral.

8. The method of claim 6, wherein said drive gear is a first gear and said shifting comprised shifting from said first gear into a second gear or a third gear.

9. A shift control system for decreasing gear select shock in an automatic transmission, comprising:

a vehicle speed sensor configured to detect a vehicle speed;

a throttle position sensor configured to detect a throttle position;

an inhibitor switch configured to detect a position of a shift lever;

an idle switch configured to detect whether an engine is in an idle state;

a controller coupled to the vehicle sensor, throttle sensor, inhibitor switch and idle switch, where the controller includes a memory comprising:

instructions for determining whether said vehicle is stopped, in a drive gear, and has been in an idle state for a predetermined period of time; and instructions for shifting the automatic transmission into a higher drive gear than said drive gear, such that torque is reduced, thereby decreasing gear shift shock on a subsequent shift into neutral; and an actuator controlled by the controller for shifting the automatic transmission into a specific gear, wherein the actuator downshifts the automatic transmission from the higher drive gear into a first drive gear if an off signal is detected from the idle switch.

* * * * *